(12) United States Patent
Huang

(10) Patent No.: US 12,103,447 B1
(45) Date of Patent: Oct. 1, 2024

(54) VEHICLE-MOUNTED AIR CIRCULATION CUSHION

(71) Applicant: Shenzhen zhongdaxin Epoxy plate Co. Ltd., Shenzhen (CN)

(72) Inventor: Shengwen Huang, Shenzhen (CN)

(73) Assignee: Shenzhen zhongdaxin Epoxy plate Co. Ltd., Shenzhen (CN)

( * ) Notice: Subject to any disclaimer, the term of this patent is extended or adjusted under 35 U.S.C. 154(b) by 0 days.

(21) Appl. No.: 18/733,965

(22) Filed: Jun. 5, 2024

(30) Foreign Application Priority Data

Feb. 2, 2024 (CN) .......................... 202410159960.6

(51) Int. Cl.
*A47C 7/24* (2006.01)
*A47C 7/02* (2006.01)
*B60N 2/56* (2006.01)

(52) U.S. Cl.
CPC .................................. *B60N 2/5642* (2013.01)

(58) Field of Classification Search
CPC ...... B60N 2/5635; B60N 2/56; B60N 2/5657; A47C 7/74; A47C 7/021; A47C 7/744
See application file for complete search history.

(56) References Cited

U.S. PATENT DOCUMENTS

| | | | | |
|---|---|---|---|---|
| 2,992,605 A * | 7/1961 | Trotman | ............. | B60N 2/5635 297/180.14 |
| 4,923,248 A * | 5/1990 | Feher | ............. | A47C 7/74 297/452.44 |
| 6,085,369 A * | 7/2000 | Feher | ............. | A47C 7/74 5/652.2 |
| 6,578,910 B2 * | 6/2003 | Andersson | ............. | A47C 7/74 297/180.13 |
| 7,070,231 B1 * | 7/2006 | Wong | ............. | B60N 2/5635 297/180.13 |
| 7,480,950 B2 * | 1/2009 | Feher | ............. | A47C 7/74 5/423 |
| 8,556,337 B1 * | 10/2013 | Cornitius-Cary | ...... | A47C 7/746 297/188.2 |
| 9,993,086 B2 * | 6/2018 | Harte | ............. | A47C 7/029 |
| 10,076,192 B2 * | 9/2018 | Ichigaya | ............. | A47C 7/021 |
| 11,857,004 B2 * | 1/2024 | Cauchy | ............. | H10N 10/13 |
| 2008/0290702 A1 * | 11/2008 | Shin | ............. | B60N 2/5628 297/180.13 |
| 2013/0278041 A1 | 10/2013 | Matsumoto et al. | | |
| 2016/0052432 A1 | 2/2016 | Lafferty et al. | | |
| 2017/0151898 A1 | 6/2017 | An et al. | | |

* cited by examiner

*Primary Examiner* — Shin H Kim
(74) *Attorney, Agent, or Firm* — Hemisphere Law, PLLC; Zhigang Ma

(57) ABSTRACT

Disclosed is a vehicle-mounted air circulation cushion, including a breathable mat made of an elastic material and a breathable mesh enclosure wrapped outside the breathable mat, further including a breathable mat base playing a role in air guide and ventilation, and a breathable reinforcing mat that is in fit connection with a surface of an upper part of the breathable mat base and used for sealing a peripheral connecting part; further including an air circulation assembly that is in modular detachable connection with the breathable mat base, and an accommodating groove that is in shape fit with the air circulation assembly is formed in one side of the breathable mat base, where an opening that is in position and shape fit with the air circulation assembly is correspondingly formed in the breathable mesh enclosure.

10 Claims, 5 Drawing Sheets

VEHICLE-MOUNTED AIR CIRCULATION CUSHION

TECHNICAL FIELD

The present disclosure relates to the technical field of vehicle-mounted cushion products, and in particular to a vehicle-mounted air circulation cushion with a reasonable structure design and an outstanding application effect.

BACKGROUND

In life, the internal space of a car belongs a confined space, due to the existence of a car seat cooling problem in the confined space, the hot weather will lead to difficult cooling, so the hot car seat is caused, even when people sit in the car seat, the hip, thigh and other parts are in close contact with the seat, the air of these parts is hard to ventilate, so the heat of these parts will collect continuously, which may affect the car use.

For the foregoing issue, people usually add a cushion on the seat to achieve breathability through the spacing of the cushion, a ventilation mat is a type of product capable of increasing the space between a sitter and the contact surface of a sitting device, so the ventilation mat is usually used in cooperation with the car seat, generally used products such as a cooling mat or a cooling mat with holes is woven by bamboos or wood, although this type of product achieves the initial cooling effect, it is limited by the material hardness such that the user easily has a discomforting feeling or other hidden dangers such as inducing eczematous dermatitis and other skin diseases after long-term use, to increase people's pains. Based on this, a further improvement made to the existing technology is required.

SUMMARY

The existing technology to be solved by this application has the following issues:

Although the cushion product in the existing technology achieves the initial cooling effect, it is limited by the material hardness such that the user easily has a discomforting feeling or other hidden dangers such as inducing eczematous dermatitis and other skin diseases after long-term use, to increase people's pains.

The solution adopted to solve the technical issue in the present disclosure is as follows:

A vehicle-mounted air circulation cushion is provided and includes a breathable mat made of an elastic material and a breathable mesh enclosure wrapped outside the breathable mat, the vehicle-mounted air circulation cushion further includes a breathable mat base playing a role in air guide and ventilation, and a breathable reinforcing mat that is in fit connection with a surface of an upper part of the breathable mat base and used for sealing a peripheral connecting part;

the vehicle-mounted air circulation cushion further includes an air circulation assembly that is in modular detachable connection with the breathable mat base, an accommodating groove that is in shape fit with the air circulation assembly is formed in one side of the breathable mat base, and an opening that is in position and shape fit with the air circulation assembly is correspondingly formed in the breathable mesh enclosure;

the air circulation assembly includes a fan module that is configured to deliver external air into the breathable mat base for air circulation;

a plurality of ventilation holes for ventilating are densely formed in the breathable mat, the breathable reinforcing mat and the breathable mesh enclosure;

a plurality of air deflectors that spread from the position of the accommodating groove to another side are integrally formed inside the breathable mat base, and the external air from the position of the air circulation assembly is divided into a plurality of branches to flow into a linear air duct between every two adjacent air deflectors; and the vehicle-mounted air circulation cushion further includes a plurality of arc-shaped air ducts arranged on the air deflectors in a form of water waves, the arc-shaped air ducts and the various linear air ducts form a staggered ventilation structure, circulating ventilation and upward air discharging.

Preferably, the ventilation holes formed in the breathable mat and the breathable reinforcing mat correspond to positions of the linear air ducts and the arc-shaped air ducts mutually, to increase the ventilation property.

Preferably, a motor fixed base that is detachably connected with the air circulation assembly is fixedly arranged at the position of the accommodating groove on one side of the breathable mat base;

the air circulation assembly further includes a fan housing for holding the fan module, a dustproof screen playing a dustproof role and a fan face cover located on the outermost side; and the fan housing is in shape fit with the motor fixed base mutually, and the whole fan housing is embedded into the motor fixed base.

Preferably, a first elastic and conductive connecting sheet is arranged inside the motor fixed base, and a second elastic and conductive connecting sheet that corresponds to the first elastic and conductive connecting sheet and plays an electrical connecting role is arranged on one side of the fan housing that faces to the motor fixed base.

Preferably, at least one clamping and limiting slot is integrally formed inside the fan housing;

a clamping and limiting strip that corresponds to the clamping and limiting slot is integrally formed outside the fan module; and when the fan module is clipped into the fan housing, the clamping and limiting strip is clipped into the clamping and limiting slot, to perform a position limitation on the movement of the fan module, thereby achieving accurate docking.

Preferably, an elastic clamping block is integrally formed outside the fan housing;

a clamping hole that fits with the elastic clamping block is arranged on the motor fixed base; and when the air circulation assembly is clipped into the motor fixed base, the elastic clamping block is in mutual clamping connection with the clamping hole, to achieve the stable and reliable docking.

Preferably, each of the air deflectors presents an arc-shaped transition structure with two high sides and a low middle; and the breathable mat is an elastic mat body structure made of Thermoplastic Elastomer (TPE) or Ethylene-vinyl Acetate (EVA).

Preferably, a rechargeable power assembly is accommodated inside the breathable mat base or a power connector for connecting an external power supply line is arranged outside the breathable mat base.

Preferably, the air circulation assembly is located at a middle position of one side of the breathable mat base; and the breathable mesh enclosure is made of a mesh fabric or a thermoplastic elastomer.

Preferably, an air collecting bin playing an air collecting role is also arranged inside the position of the accommodating slot of the breathable mat base, and the external air collects at the position of the air collecting bin and then flows into the different linear air ducts.

The technical effects achieved by solving the technical issue in this application are as follows:

Compared with the existing technology, the vehicle-mounted air circulation cushion provided by the present disclosure is provided with the breathable mat 13 made of the elastic material and the breathable mesh enclosure 14 wrapped outside the breathable mat 13 at the same time, the vehicle-mounted air circulation cushion further includes the breathable mat base 11 playing the role in air guide and ventilation, and the breathable reinforcing mat 12 that is in fit connection with the surface of the upper part of the breathable mat base 11 and used for sealing the peripheral connecting part; the vehicle-mounted air circulation cushion further includes the air circulation assembly 15 that is in modular detachable connection with the breathable mat base 11, the accommodating groove that is in shape fit with the air circulation assembly 15 is formed in one side of the breathable mat base 11, and the opening 141 that is in position and shape fit with the air circulation assembly 15 is correspondingly formed in the breathable mesh enclosure 14; the air circulation assembly 15 includes the fan module 152 that is configured to deliver the external air into the breathable mat base 11 for air circulation, the plurality of ventilation holes for ventilating are densely formed in the breathable mat 13, the breathable reinforcing mat 12 and the breathable mesh enclosure 14, and the air deflectors 112 that spread from the position of the accommodating groove to another side are integrally formed inside the breathable mat base 11, and the external air from the position of the air circulation assembly 15 is divided into the plurality of branches to flow into the linear air duct between every two adjacent air deflectors 112; the vehicle-mounted air circulation cushion further includes the plurality of arc-shaped air ducts 113 arranged on the air deflectors 112 in a form of water waves, the arc-shaped air ducts 113 and the various linear air ducts form the staggered ventilation structure, circulating ventilation and upward air discharging, to improve and enhance the ventilation effect well in the cushion in an actual application, with a better cooling property and a higher experience degree.

Figure 1:
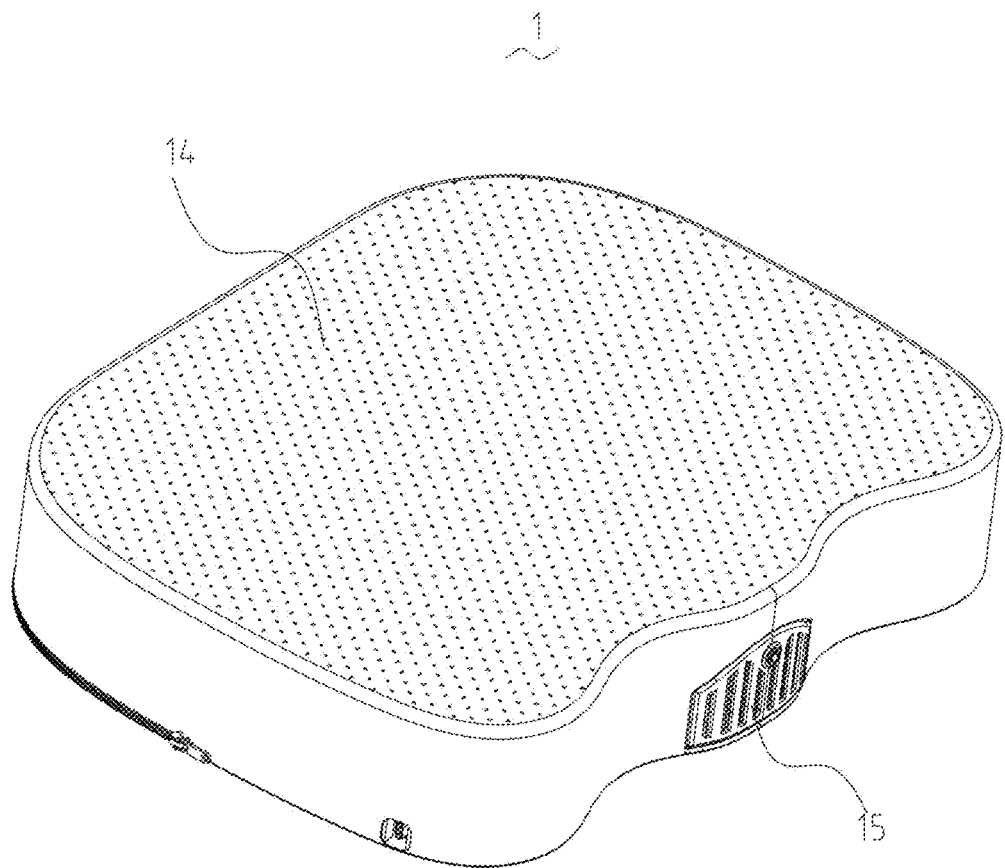
FIG. 1 is a structure schematic diagram of a solid structure of a vehicle-mounted air circulation cushion according to the present disclosure.

In the drawings: breathable mat base 11; motor fixed base 111; air deflector 112; arc-shaped air duct 113; breathable reinforcing mat 12; breathable mat 13; breathable mesh enclosure 14; air circulation assembly 15; fan housing 151; fan module 152; dustproof screen 153; fan face cover 154.

DETAILED DESCRIPTION OF THE EMBODIMENTS

In order to make the objectives, technical solution and advantages of the present disclosure clearer and definer, the present disclosure will be described in detail below in conjunction with the drawings and the embodiments. It is understood that the specific embodiments described herein are merely used for explaining the present disclosure, instead of limiting the present disclosure.

Figure 2:
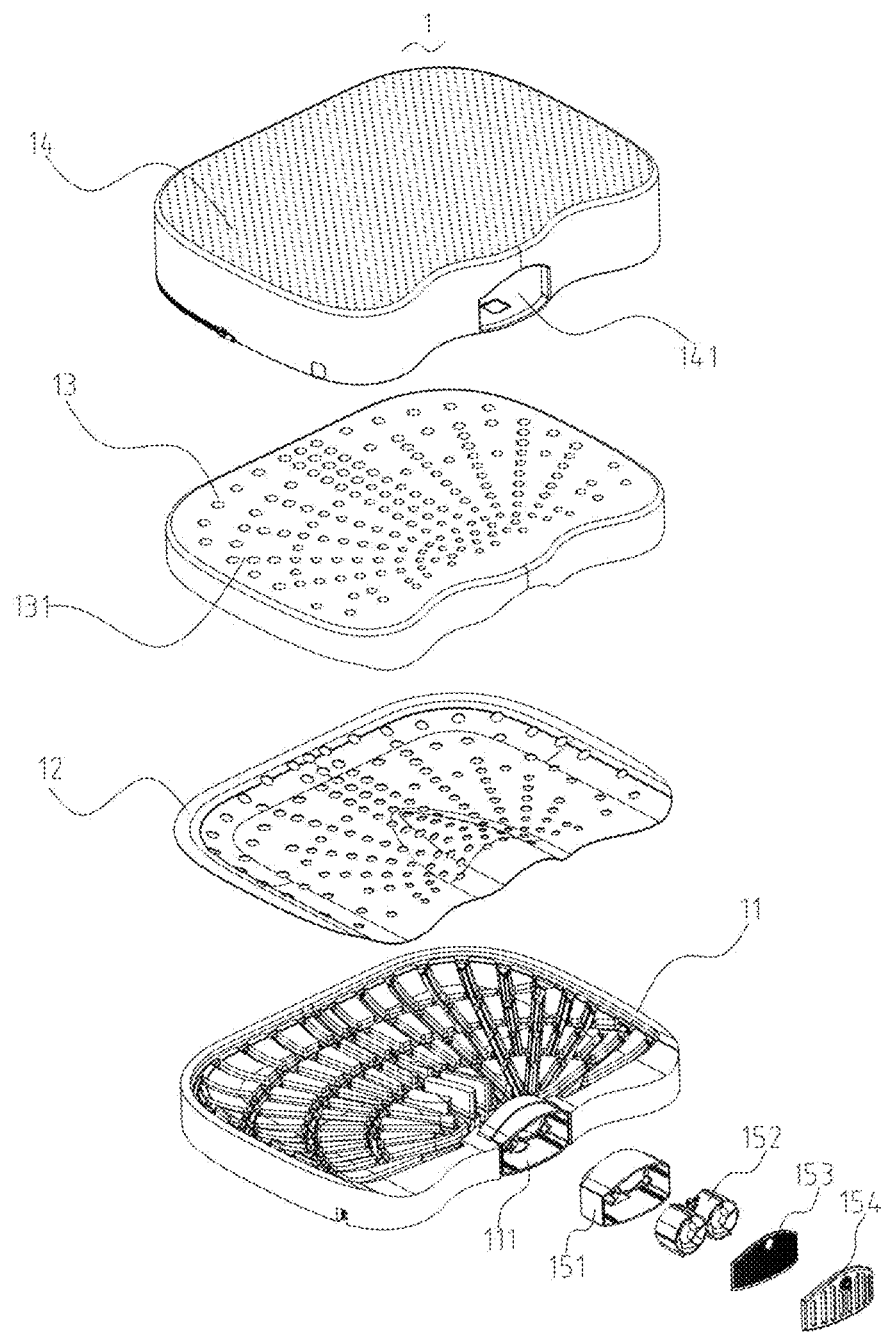
FIG. 2 is a structure schematic diagram of an exploded state of a vehicle-mounted air circulation cushion according to the present disclosure.
Figure 3:
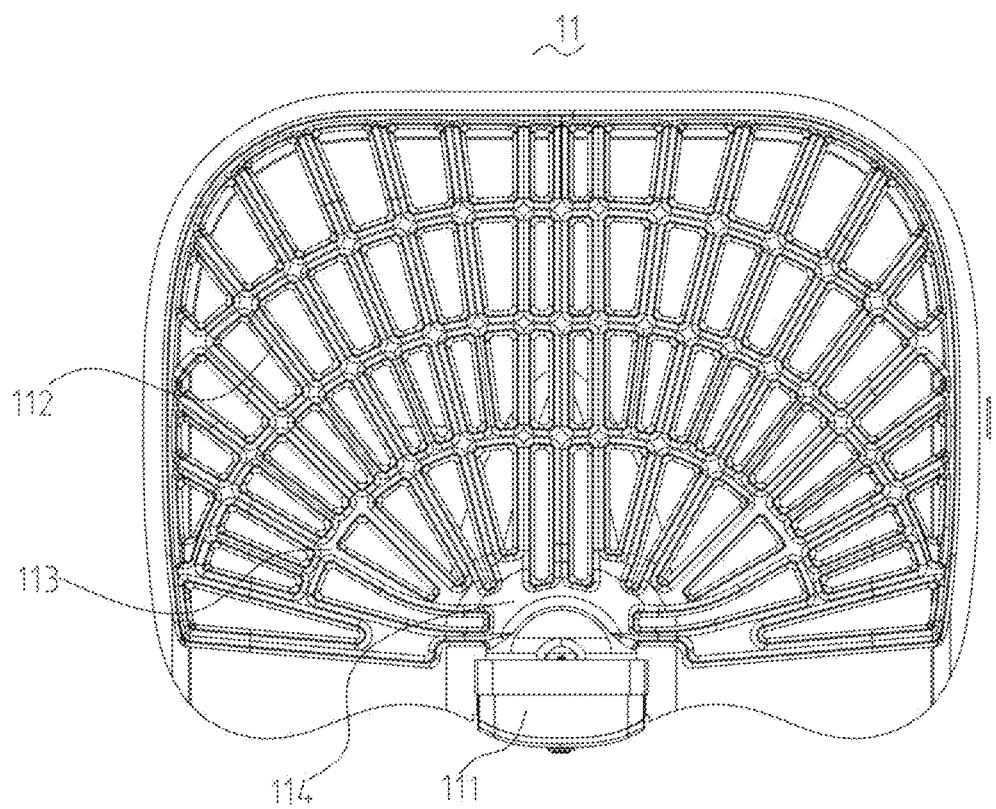
FIG. 3 is a structure schematic diagram of a front state of a breathable mat base in a vehicle-mounted air circulation cushion according to the present disclosure.
Figure 4:
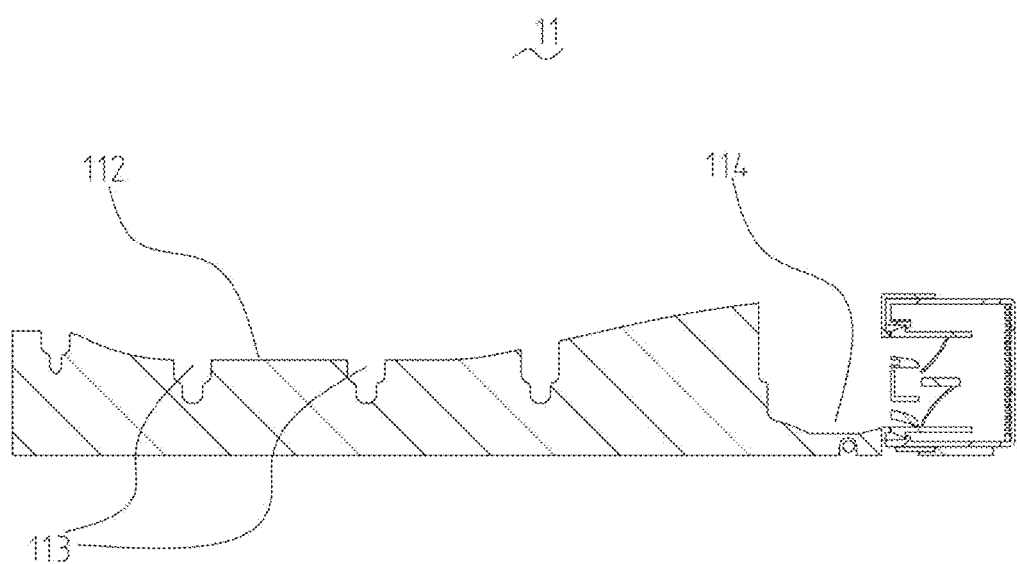
FIG. 4 is a structure schematic diagram of a cross section state of a breathable mat base in a vehicle-mounted air circulation cushion according to the present disclosure.
Figure 5:
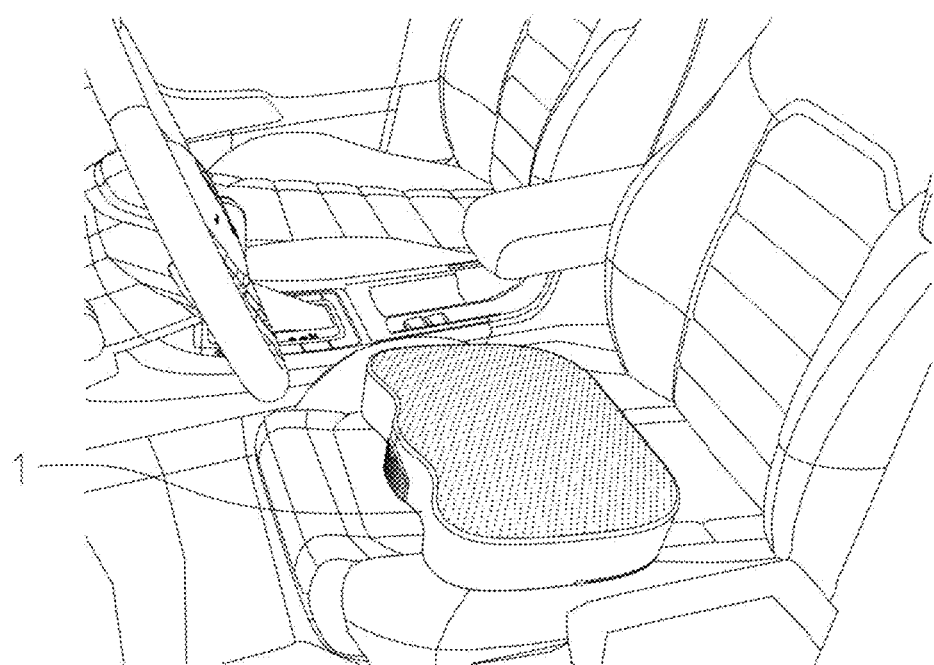
FIG. 5 is a structure schematic diagram of an application state of a vehicle-mounted air circulation cushion according to the present disclosure.

Please refer to FIG. 1 to FIG. 5, a vehicle-mounted air circulation cushion 1 provided by the present disclosure includes a breathable mat 13 made of an elastic material and a breathable mesh enclosure 14 wrapped outside the breathable mat 13, the vehicle-mounted air circulation cushion further includes a breathable mat base 11 playing a role in air guide and ventilation, and a breathable reinforcing mat 12 that is in fit connection with a surface of an upper part of the breathable mat base 11 and used for sealing a peripheral connecting part;

the vehicle-mounted air circulation cushion further includes an air circulation assembly 15 that is in modular detachable connection with the breathable mat base 11, an accommodating groove that is in shape fit with the air circulation assembly 15 is formed in one side of the breathable mat base 11, and an opening 141 that is in position and shape fit with the air circulation assembly 15 is correspondingly formed in the breathable mesh enclosure 14;

the air circulation assembly 15 includes a fan module 152 that is configured to deliver external air into the breathable mat base 11 for air circulation;

a plurality of ventilation holes for ventilating are densely formed in the breathable mat 13, the breathable reinforcing mat 12 and the breathable mesh enclosure 14;

a plurality of air deflectors 112 that spread from the position of the accommodating groove to another side are integrally formed inside the breathable mat base 11, and the external air from the position of the air circulation assembly 15 is divided into a plurality of branches to flow into a linear air duct between every two adjacent air deflectors 112; and the vehicle-mounted air circulation cushion further includes a plurality of arc-shaped air ducts 113 arranged on the air deflectors 112 in a form of water waves, the arc-shaped air ducts 113 and the various linear air ducts form a staggered ventilation structure, circulating ventilation and upward air discharging.

This application is provided with the breathable mat 13 made of the elastic material and the breathable mesh enclosure 14 wrapped outside the breathable mat 13 at the same time, the vehicle-mounted air circulation cushion further includes the breathable mat base 11 playing the role in air guide and ventilation, and the breathable reinforcing mat 12 that is in fit connection with the surface of the upper part of the breathable mat base 11 and used for sealing the peripheral connecting part; the vehicle-mounted air circulation cushion further includes the air circulation assembly 15 that is in modular detachable connection with the breathable mat base 11, the accommodating groove that is in shape fit with the air circulation assembly 15 is formed in one side of the breathable mat base 11, and the opening 141 that is in position and shape fit with the air circulation assembly 15 is correspondingly formed in the breathable mesh enclosure 14; the air circulation assembly 15 includes the fan module 152 that is configured to deliver the external air into the breathable mat base 11 for air circulation, the plurality of ventilation holes for ventilating are densely formed in the breathable mat 13, the breathable reinforcing mat 12 and the breathable mesh enclosure 14, and the air deflectors 112 that spread from the position of the accommodating groove to another side are integrally formed inside the breathable mat base 11, and the external air from the position of the air circulation assembly 15 is divided into the plurality of branches to flow into the linear air duct between every two adjacent air deflectors 112; the vehicle-mounted air circulation cushion further includes the plurality of arc-shaped air ducts 113 arranged on the air deflectors 112 in a form of water waves, the arc-shaped air ducts 113 and the various linear air ducts form the staggered ventilation structure, circulating ventilation and upward air discharging, to improve and enhance the ventilation effect well in the cushion in an actual application, with a better cooling property and a higher experience degree.

This application discloses a vehicle-mounted air circulation cushion, belonging to the technical field of air circulation cushions and including an elastic mat body and an air circulation assembly 15, where the air circulation assembly 15 is arranged in the mat body, and a front end thereof is provided with a plurality of air inlets and a ventilation opening that communicates with the air deflectors for circulation; and the assembly is arranged in the elastic mat body and a front end thereof is provided with an air inlet and an annular and reverse air outlet, and the structures of the annular air deflectors generate the exchange of cold and hot air to achieve air cooling.

In this application, the air circulating ventilation assembly is arranged on the air deflectors 112 in the mat body such that the ventilation assembly can perform circulating ventilation and upward air discharging simultaneously when working, the ventilation of the air circulation fan may enable to exchange cold and hot air at the contact part of the cushion and the hip or thigh in this solution structure, and therefore the users feel cooler when sitting in the cushion, and the cushion includes an elastic mat body and an air circulation assembly 15;

the air circulation assembly 15 is arranged in the mat body, and a front end thereof is provided with a plurality of air inlets and a ventilation opening that communicates with the air deflectors for circulation;

the assembly is arranged in the elastic mat body and a front end thereof is provided with an air inlet and an annular and reverse air outlet; and the structures of the annular air deflectors generate the exchange of cold and hot air to achieve air cooling.

In some other embodiments, the ventilation holes formed in the breathable mat 13 and the breathable reinforcing mat 12 correspond to positions of the linear air ducts and the arc-shaped air ducts 113 mutually, to increase the ventilation property.

In the specific part of the technical effect, this application generates the exchange of cold and hot air by the annular air deflectors to achieve air cooling.

A motor fixed base 111 that is detachably connected with the air circulation assembly 15 is fixedly arranged at the position of the accommodating groove on one side of the breathable mat base 11;

the air circulation assembly 15 further includes a fan housing 151 for holding the fan module 152, a dustproof screen 153 playing a dustproof role and a fan face cover 154 located on the outermost side; and the fan housing 151 in shape fit with the motor fixed base 111 mutually, and the whole fan housing 151 is embedded into the motor fixed base 111.

A first elastic and conductive connecting sheet is arranged inside the motor fixed base 111, and a second elastic and conductive connecting sheet that corresponds to the first elastic and conductive connecting sheet and plays an electrical connecting role is arranged on one side of the fan housing 151 that faces to the motor fixed base 111.

At least one clamping and limiting slot is integrally formed inside the fan housing 151;

a clamping and limiting strip that corresponds to the clamping and limiting slot is integrally formed outside the fan module 152; and when the fan module 152 is clipped into the fan housing 151, the clamping and limiting strip is clipped into the clamping and limiting slot, to perform a position limitation on the movement of the fan module 152, thereby achieving accurate docking.

An elastic clamping block is integrally formed outside the fan housing 151;

a clamping hole that fits with the elastic clamping block is arranged on the motor fixed base 111; and when the air circulation assembly 15 is clipped into the motor fixed base 111, the elastic clamping block is in mutual clamping connection with the clamping hole, to achieve the stable and reliable docking.

Each of the air deflectors 112 presents an arc-shaped transition structure with two high sides and a low middle; and the breathable mat is 13 an elastic mat body structure made of TPE or EVA.

A rechargeable power assembly is accommodated inside the breathable mat base 11 or a power connector for connecting an external power supply line is arranged outside the breathable mat base 11.

The air circulation assembly 15 is located at a middle position of one side of the breathable mat base 11; and the breathable mesh enclosure 14 is made of a mesh fabric or a thermoplastic elastomer.

An air collecting bin 114 playing an air collecting role is also arranged inside the position of the accommodating slot of the breathable mat base 11, and the external air collects at the position of the air collecting bin 114 and then flows into the different linear air ducts.

In this application, the air circulating ventilation assembly is arranged on the air deflectors 112 in the mat body such that the ventilation assembly can perform circulating ventilation and upward air discharging simultaneously when working, the ventilation of the air circulation fan may enhance the exchange of the cold and hot air at the contact part of the cushion and the hip or thigh in this solution structure.

The breathable mat surface is combined with upper ends of the air deflectors and reaches a side wall of a ventilating duct through the through hole of the mat body to achieve the function of air circulation, and the breathable mat surface thereon is provided with a plurality of ventilation holes.

The breathable reinforcing mat 12 is made of an elastic material, and the main body of the air circulation cushion is made of an elastomer material. For example, the material may be TPE, or sponge or EVA and other thermoplastic elastomer materials.

The breathable mesh enclosure 14 is made of a high-density breathable mesh polyester fiber material, and the main polyester fiber material is the elastomer material. For example, the material may be a breathable mesh fabric or Polyolyaltha Olfin (POE) and other thermoplastic elastomer materials, and the breathable reinforcing mat 12 is an elastic material mat surface with the main material of the elastomer material. For example, the material may be silica gel, or POE and other thermoplastic elastomer materials, with about 40-80 degrees of hardness tested by a Shore durometer.

The breathable reinforcing mat 12 is combined with upper ends of the air deflectors 112 and reaches a side wall of a ventilating duct through the through hole of the mat body to achieve the function of air circulation, and the breathable mat surface thereon is provided with a plurality of circular ventilation holes or other shapes of pore structures.

The technical effects achieved by solving the technical issue in this application are as follows:

Compared with the existing technology, the vehicle-mounted air circulation cushion 1 provided by the present disclosure is provided with the breathable mat 13 made of the elastic material and the breathable mesh enclosure 14 wrapped outside the breathable mat 13 at the same time, the vehicle-mounted air circulation cushion further includes the breathable mat base 11 playing the role in air guide and ventilation, and the breathable reinforcing mat 12 that is in fit connection with the surface of the upper part of the breathable mat base 11 and used for sealing the peripheral connecting part; the vehicle-mounted air circulation cushion further includes the air circulation assembly 15 that is in the modular detachable connection with the breathable mat base 11, the accommodating groove that is in shape fit with the air circulation assembly 15 is formed in one side of the breathable mat base 11, and the opening 141 that is in position and shape fit with the air circulation assembly 15 is correspondingly formed in the breathable mesh enclosure 14; the air circulation assembly 15 includes the fan module 152 that is configured to deliver the external air into the breathable mat base 11 for air circulation, the plurality of ventilation holes for ventilating are densely formed in the breathable mat 13, the breathable reinforcing mat 12 and the breathable mesh enclosure 14, and the air deflectors 112 that spread from the position of the accommodating groove to another side are integrally formed inside the breathable mat base 11, and the external air from the position of the air circulation assembly 15 is divided into the plurality of branches to flow into the linear air duct between every two adjacent air deflectors 112; the vehicle-mounted air circulation cushion further includes the plurality of arc-shaped air ducts 113 arranged on the air deflectors 112 in a form of water waves, the arc-shaped air ducts 113 and the various linear air ducts form the staggered ventilation structure, circulating ventilation and upward air discharging, to improve and enhance the ventilation effect well in the cushion in an actual application, with a better cooling property and a higher experience degree.

The above are the implementations of the present disclosure, and does not constitute a limitation to the protection scope of the present disclosure. Any modifications, equivalent replacements, improvements and the like made within the spirit and principle of the present disclosure shall fall within the scope of protection of claims in the present disclosure.

What is claimed is:

1. A vehicle-mounted air circulation cushion, comprising a breathable mat made of an elastic material and a breathable mesh enclosure wrapped outside the breathable mat, wherein the vehicle-mounted air circulation cushion further comprises a breathable mat base playing a role in air guide and ventilation, and a breathable reinforcing mat that is in fit connection with a surface of an upper part of the breathable mat base and used for sealing a peripheral connecting part;

the vehicle-mounted air circulation cushion further comprises an air circulation assembly that is in modular detachable connection with the breathable mat base, an accommodating groove that is in shape fit with the air circulation assembly is formed in one side of the breathable mat base, and an opening that is in position and shape fit with the air circulation assembly is correspondingly formed in the breathable mesh enclosure;

the air circulation assembly comprises a fan module that is configured to deliver external air into the breathable mat base for air circulation;

a plurality of ventilation holes for ventilating are densely formed in the breathable mat, the breathable reinforcing mat and the breathable mesh enclosure;

a plurality of air deflectors that spread from the position of the accommodating groove to another side are integrally formed inside the breathable mat base, and the external air from the position of the air circulation assembly is divided into a plurality of branches to flow into a linear air duct between every two adjacent air deflectors; and the vehicle-mounted air circulation cushion further comprises a plurality of arc-shaped air ducts arranged on the air deflectors in a form of water waves, the arc-shaped air ducts and the various linear air ducts form a staggered ventilation structure, circulating ventilation and upward air discharging.

2. The vehicle-mounted air circulation cushion according to claim 1, wherein the ventilation holes formed in the breathable mat and the breathable reinforcing mat correspond to positions of the linear air ducts and the arc-shaped air ducts mutually, to increase the ventilation property.

3. The vehicle-mounted air circulation cushion according to claim 1, wherein a motor fixed base that is detachably connected with the air circulation assembly is fixedly arranged at the position of the accommodating groove on one side of the breathable mat base;

the air circulation assembly further comprises a fan housing for holding the fan module, a dustproof screen playing a dustproof role and a fan face cover located on the outermost side; and the fan housing is in shape fit with the motor fixed base mutually, and the whole fan housing is embedded into the motor fixed base.

4. The vehicle-mounted air circulation cushion according to claim 3, wherein a first elastic and conductive connecting sheet is arranged inside the motor fixed base, and a second elastic and conductive connecting sheet that corresponds to the first elastic and conductive connecting sheet and plays an electrical connecting role is arranged on one side of the fan housing that faces to the motor fixed base.

5. The vehicle-mounted air circulation cushion according to claim 3, wherein at least one clamping and limiting slot is integrally formed inside the fan housing;

a clamping and limiting strip that corresponds to the clamping and limiting slot is integrally formed outside the fan module; and when the fan module is clipped into the fan housing, the clamping and limiting strip is clipped into the clamping and limiting slot, to perform a position limitation on the movement of the fan module, thereby achieving accurate docking.

6. The vehicle-mounted air circulation cushion according to claim 3, wherein an elastic clamping block is integrally formed outside the fan housing;
   a clamping hole that fits with the elastic clamping block is arranged on the motor fixed base; and
   when the air circulation assembly is clipped into the motor fixed base, the elastic clamping block is in mutual clamping connection with the clamping hole, to achieve the stable and reliable docking.

7. The vehicle-mounted air circulation cushion according to claim 1, wherein each of the air deflectors presents an arc-shaped transition structure with two high sides and a low middle; and
   the breathable mat is an elastic mat body structure made of Thermoplastic Elastomer (TPE) or Ethylene-vinyl Acetate (EVA).

8. The vehicle-mounted air circulation cushion according to claim 1, wherein a rechargeable power assembly is accommodated inside the breathable mat base or a power connector for connecting an external power supply line is arranged outside the breathable mat base.

9. The vehicle-mounted air circulation cushion according to claim 1, wherein the air circulation assembly is located at a middle position of one side of the breathable mat base; and
   the breathable mesh enclosure is made of a mesh fabric or a thermoplastic elastomer.

10. The vehicle-mounted air circulation cushion according to claim 1, wherein an air collecting bin playing an air collecting role is also arranged inside the position of the accommodating slot of the breathable mat base, and the external air collects at the position of the air collecting bin and then flows into the different linear air ducts.

* * * * *